(12) United States Patent
Boyer et al.

(10) Patent No.: US 7,389,304 B2
(45) Date of Patent: Jun. 17, 2008

(54) GENERATING A RELATIONAL VIEW FOR A BASE MODEL SCHEMA

(75) Inventors: Philip L. Boyer, San Jose, CA (US); Sharon T. Conn, Scottsdale, AZ (US); Amy Marie Silberbauer, Modesto, CA (US)

(73) Assignee: International Business Machines Corporation

( * ) Notice: Subject to any disclaimer, the term of this patent is extended or adjusted under 35 U.S.C. 154(b) by 480 days.

(21) Appl. No.: 11/021,796

(22) Filed: Dec. 22, 2004

(65) Prior Publication Data

US 2006/0136804 A1    Jun. 22, 2006

(51) Int. Cl.
G06F 17/00 (2006.01)
G06F 7/00 (2006.01)
G06F 15/00 (2006.01)

(52) U.S. Cl. .................. 707/102; 707/103 R; 715/500
(58) Field of Classification Search ................ 707/102, 707/103 R; 715/500
See application file for complete search history.

(56) References Cited

U.S. PATENT DOCUMENTS

| | | | |
|---|---|---|---|
| 5,627,979 A * | 5/1997 | Chang et al. ............... | 715/763 |
| 5,699,310 A | 12/1997 | Garloff et al. | |
| 6,199,195 B1 | 3/2001 | Goodwin et al. | |
| 6,289,382 B1 | 9/2001 | Bowman-Amuah | |
| 6,292,932 B1 | 9/2001 | Baisley et al. | |
| 6,477,527 B2 * | 11/2002 | Carey et al. ................... | 707/4 |
| 2001/0051948 A1 * | 12/2001 | Srinivasan et al. ......... | 707/102 |
| 2002/0184264 A1 | 12/2002 | Berg et al. | |
| 2003/0058277 A1 * | 3/2003 | Bowman-Amuah ......... | 345/765 |
| 2003/0084424 A1 | 5/2003 | Reddy et al. | |
| 2003/0110073 A1 * | 6/2003 | Briel et al. ................... | 705/10 |
| 2003/0135657 A1 | 7/2003 | Barker et al | |
| 2003/0149934 A1 * | 8/2003 | Worden ...................... | 715/513 |
| 2003/0163479 A1 * | 8/2003 | Mathews et al. ........... | 707/102 |
| 2003/0208505 A1 * | 11/2003 | Mullins et al. .............. | 707/102 |
| 2004/0093344 A1 * | 5/2004 | Berger et al. ................ | 707/102 |
| 2004/0103393 A1 | 5/2004 | Reddy et al. | |
| 2004/0216085 A1 * | 10/2004 | Wilson et al. ............... | 717/108 |
| 2005/0050068 A1 * | 3/2005 | Vaschillo et al. ........... | 707/100 |
| 2005/0108684 A1 * | 5/2005 | Sohn et al. .................. | 717/120 |

FOREIGN PATENT DOCUMENTS

EP    0 973 091    1/2000

(Continued)

OTHER PUBLICATIONS

Braganholo, Vanessa P., et al., "From XML View Updates to Relational View Updates: Old Solutions to a New Problem", Proc. of the 30th VLDB Conf., Toronto, Canada, Aug. 29-Sep. 3, 2004, pp. 276-287.*

(Continued)

*Primary Examiner*—John Breene
*Assistant Examiner*—Robert Stevens
(74) *Attorney, Agent, or Firm*—Konrad Raynes & Victor, LLP; Janaki K. Davda

(57) ABSTRACT

Disclosed is a technique for generating a relational view. Initially, identification of a base model, a relational schema, and a ViewType are received. Then, a statement to create a relational view of the instance data for the base model using the ViewType is automatically generated.

18 Claims, 6 Drawing Sheets

FOREIGN PATENT DOCUMENTS

| | | |
|---|---|---|
| WO | WO-01/16668 | 3/2001 |
| WO | WO-01/16704 | 3/2001 |
| WO | WO-01/16705 | 3/2001 |
| WO | WO-01/16706 | 3/2001 |
| WO | WO-01/16723 | 3/2001 |
| WO | WO-01/16724 | 3/2001 |
| WO | WO-01/16726 | 3/2001 |
| WO | WO-01/16727 | 3/2001 |
| WO | WO-01/16728 | 3/2001 |
| WO | WO-01/16729 | 3/2001 |
| WO | WO-01/16733 | 3/2001 |
| WO | WO-01/16734 | 3/2001 |
| WO | WO-01/16735 | 3/2001 |
| WO | WO-01/16739 | 3/2001 |
| WO | WO-01/17194 | 3/2001 |
| WO | WO-01/17195 | 3/2001 |

OTHER PUBLICATIONS

Mishra, Sanjay, et al., Mastering Oracle SQL, O'Reilly & Associates, Sebastopol, CA, Apr. 2002, pp. 1-2, 14-18, 43-54, 77-78 and 159-162.*

Braganholo, Vanessa P., et al., "Propagating XML View Updates to a Relational Database", UFRGS Technical Report No. RP-341, Porto Alegre, Brazil, Feb. 2004, pp. 1-31.*

Braganholo, Vanessa P., et al., "Reasoning About the Updatability of XML Views Over Relational Databases", Univ. of Pennsylvania Dept. of Computer and Information Science Technical Report No. MS-CIS-03-13, Philadelphia, PA, © 2003, pp. 1 and 1-17.*

Bézivin, Jean, et al., "Towards a True Reflective Modeling Scheme", Reflection and Software Engineering, LNCS 1826, Springer-Verlag, Berlin, Germany, © 2000, pp. 21-38.*

Boger, Marko, et al., "Diagram Interchange for UML", UML 2002, LNCS 2460, Springer-Verlag, Berlin, Germany, © 2002, pp. 398-411.*

Kovacs, Z., et al., "Patterns for Integrating Manufacturing Product and Process Models", EDOC '99, Mannheim, Germany, Sep. 27-30, 1999, pp. 37-48.*

Cooperative Research Centre For Distributed Systems Technology (DSTC), "Meta-Object Facility", [online], Jan. 17, 1997, [Retrieved on Oct. 12, 2001]. Retrieved from the Internet at <URL:http://www.dstc.cdu.au/Research/Projects/MOF/Publications/OMG/MOF/dstc_mof.pdf>.

Egyed, A., "Integrating Architectural Views in UML", *Technical Report*, [online], Mar. 10, 1999, [Retrieved on Oct. 12, 2001]. Retrieved from the Internet at <URL: http://sunset.usc.edu/publications/techrpts/1999/usccse99-514/usccse99-514.pdf>.

Felsinger, R., "UML Project Plan", [online], Jan. 29, 2001, [Retrieved on Oct. 12, 2001]. Retrieved from the Internet at <URL: http://www.felsinger.com/downloads/UMLProjectPlan.pdf>.

Lagerweij, W., "Design of an Object Oriented Framework Using the Unified Modeling Language", [online], [Retrieved on Oct. 12, 2001]. Retrieved from the Internet at <URL: http://www.euronet.nl/~wouterla/thesis/scriptie/thesis.html>.

Object Management Group (OMG), "Common Warehouse Metamodel (CWM) Specification", [online], Feb. 11, 2000, [Retrieved on Oct. 12, 2001]. Retrieved from the Internet at <URL: http://www.omg.org/docs/ad/00-01-01.pdf>.

U.S. Patent Application filed Dec. 22, 2004, entitled "Using Viewtypes for Accessing Instance Data Structured by a Base Model", invented by S.T. Conn, A.M. Silberbauer, and P.L. Boyer.

U.S. Patent Application filed Dec. 22, 2004, entitled "Defining and Generating a Viewtype for a Base Model", invented by Conn, S.T., J.P. Daudenarde, A.M. Silberbauer, and P.L. Boyer.

Atkinson, C. and T. Kuhne, "Model-Driven Development: A Melamodeling Foundation", IEEE Software, Sep./Oct. 2003, pp. 36-41.

Brown, AL., "An Introduction to Model Driven Architecture", [online], Feb. 17, 2004, [Retrieved on Jul. 13, 2007], retrieved from the Internet at <URL: http://www.ibm.com/developerworks/rational/library/3100.html>, 15 pp.

Budinsky, F., G. Decandio, R.Earle, T. Francis, J. Jones, J. Li, M. Nally, C. Nelin, V. Popescu, S. Rich, A. Ryman, and T. Wilson, "WebSphere Studio Overview", IBM Systems Journal, vol. 43, No. 2, 2004, pp. 384-419.

Iyengar, S., "Business Process Integration Using UML and BPEL4WS", SI-SE 2004, 60 pp.

Kuhn, H., F. Bayer, S. Junginger, and D. Karagiannis, "Enterprise Model Integration", Proceedings of the 4th International Conference on E-Commerce and Web Technologies, Sep. 2003, pp. 379-392.

Rayside, D., M. Litoiu, M. Storey, C. Best, and R. Lintern, "Visualizing Flow Diagrams in WebSphere Studio Using SHriMP Views", Information Systems Frontiers, vol.5, No. 2, Apr. 2003, pp. 161-174.

* cited by examiner

GENERATING A RELATIONAL VIEW FOR A BASE MODEL SCHEMA

CROSS-REFERENCE TO RELATED APPLICATIONS

This application is related to the following commonly assigned and co-pending U.S. patent applications:

U.S. patent application No. 11/021,730, entitled "DEFINING AND GENERATING A VIEW TYPE FOR A BASE MODEL," by S. Conn, et al., Docket No. SVL920030036US1; and U.S. patent application No. 11/021,898, entitled "USING VIEWTYPES FOR ACCESSING INSTANCE DATA STRUCTURED BY A BASE MODEL," by S. Conn et al., Docket No. SVL920030034US1;

each of which is filed on the same date herewith, and which is incorporated by reference herein in its entirety.

BACKGROUND

1. Field

The present invention is related to generating a relational view for a base model schema.

2. Description of the Related Art

An Essential Meta-Object Facility (EMOF) specification describes a framework for describing and representing metadata (i.e., data describing other data). The EMOF specification provides EMOF model constructs that enable creation of metadata models. A metadata model includes objects described by EMOF classes (defined by the EMOF model), links that connect objects described by EMOF associations, and data values. An EMOF class may include a class name, attributes, operations, association references, and other elements. An association reference enables an EMOF object to be "aware" of being in a relationship with other objects via an association, and the relationship links may be navigated or traversed to get to other data in the model (e.g., to perform operations on objects in a metadata model). An EMOF class may inherit characteristics (e.g., attributes, operations, etc.) from other EMOF classes.

Unified Modeling Language (UML) is a notational language for specifying and visualizing software, (e.g., object-oriented projects) and was developed by the Object Management Group (OMG). An EMOF metadata model may be represented using a UML model. For more information regarding EMOF and UML, see the World Wide Web, omg.org.

When defining an EMOF-based model in a relational database, the resulting relational schema (e.g., a logical classification of database objects in a database) for representing the EMOF-based model may be substantially complex. Consequently, dealing with instance data for classes of the model may also be very complicated.

Additionally, because the EMOF-based model may be a network of many interrelated classes, resulting database tables that hold instance data for the EMOF-based model are likewise all interrelated. In order to write Structured Query Language (SQL) queries against the resulting tables, a user must be familiar with the EMOF-based model as well as the mapping between the EMOF-based model and the relational tables.

Thus, there is a need in the art for more simply defining views for scoping and accessing data in database tables that hold instance data for an EMOF-based model.

SUMMARY OF THE INVENTION

Provided are a method, system, and program for generating a relational view. Initially, identification of a base model, a relational schema, and a ViewType are received. Then, a statement to create a relational view of the instance data for the base model using the ViewType is automatically generated.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the invention. It is understood that other implementations may be utilized and structural and operational changes may be made without departing from the scope of implementations of the invention.

Figure 1:
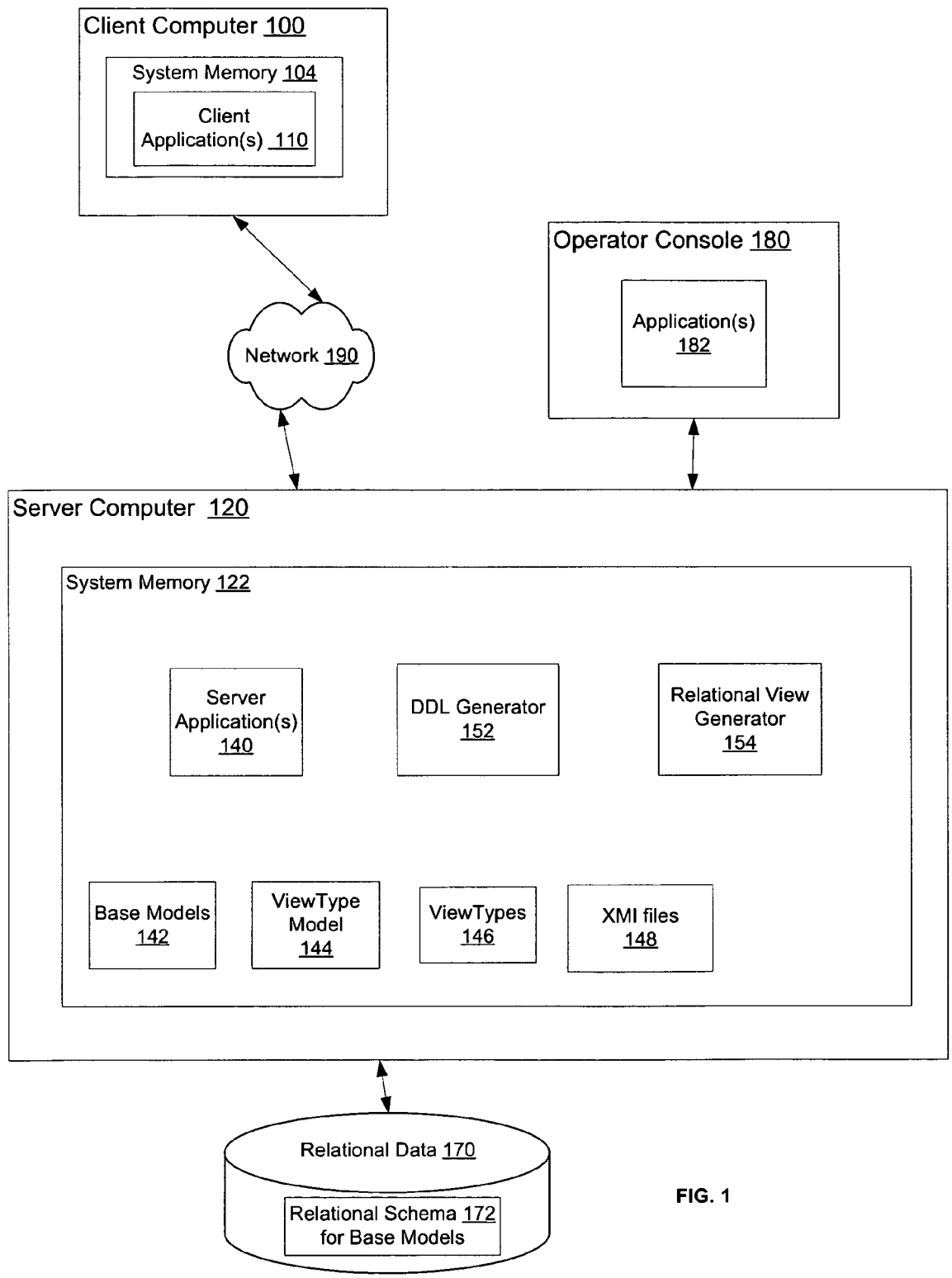
FIG. 1 illustrates, in a block diagram, a computing environment in accordance with certain implementations of the invention.

FIG. 1 illustrates, in a block diagram, a computing environment in accordance with certain implementations of the invention. A client computer 100 is connected via a network 190 to a server computer 120. The client computer 100 includes system memory 104, which may be implemented in volatile and/or non-volatile devices. One or more client applications 110 may execute in the system memory 104.

The server computer 120 includes system memory 122, which may be implemented in volatile and/or non-volatile devices. System memory 122 may store base models 142, a ViewType model 144, and ViewTypes 146. A ViewType 146 uses a base model (i.e., a subset of the base model or the base model in its entirety). For example, a ViewType 146 that uses the base model in its entirety may be referred to as a comprehensive ViewType. A ViewType 146 references classes, attributes, and associations of a base model 142 (i.e., either a subset or in its entirety) as ViewType objects. For example, a ViewType 146 uses parts of a base model 142 by naming classes from the base model. ViewType objects of a ViewType 146 may be defined by a ViewType model 144. A ViewType 146 may be referred to as a "map" that is used to traverse the objects of the base model.

Implementations of the invention provide a new Base_Model_To_DDL command that generates the Data Definition Language (DDL) needed to define tables and indexes in a relational database. The new Base_Model_To_DDL command takes as input a base model and outputs the DDL. A DDL generator 152 processes the new Base_Model- _To_DDL command to output the DDL. The DDL generator 152 also creates INSERT statements for storing information into certain system tables.

A relational view generator 154 generates a statement (e.g., a SQL statement) for defining a relational view for instance data of a base model 142. The relational view is defined using a ViewType 146 that references the base model 142.

The server computer 120 provides the client computer 100 with access to data in a relational data store 170 that also includes relational schema 172 for base models. An operator console 180 executes one or more applications 182 and is used to access the server computer 120.

The client computer 100 may comprise any computing device known in the art, such as a server, mainframe, workstation, personal computer, hand held computer, laptop telephony device, network appliance, etc. The network 190 may comprise any type of network, such as, for example, a Storage Area Network (SAN), a Local Area Network (LAN), Wide Area Network (WAN), the Internet, an Intranet, etc. The relational data store 170 may comprise an array of storage devices, such as Direct Access Storage Devices (DASDs), Just a Bunch of Disks (JBOD), Redundant Array of Independent Disks (RAID), virtualization device, etc.

Figure 2:
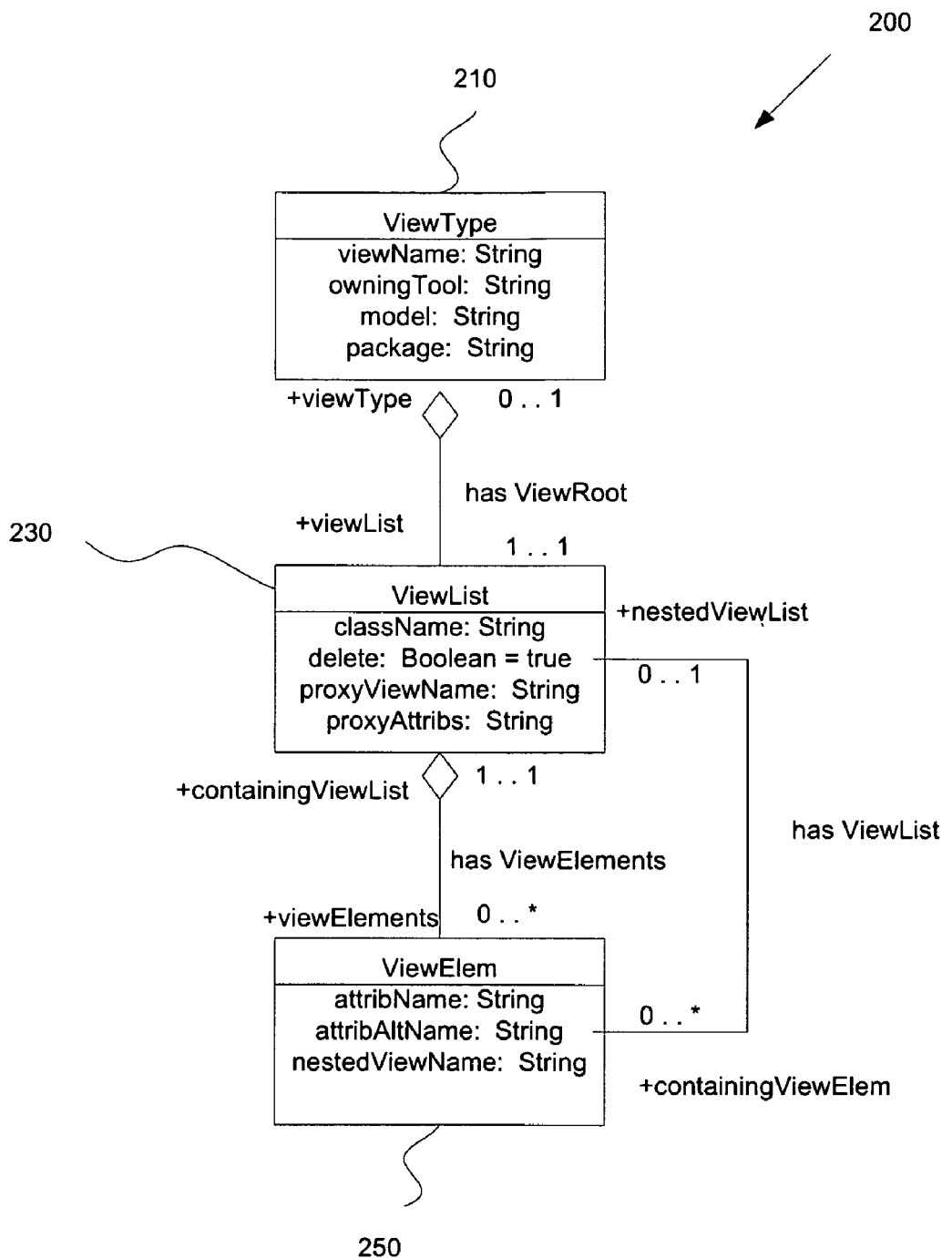
FIG. 2 illustrates a ViewType model in accordance with certain implementations of the invention.

FIG. 2 illustrates a ViewType model 200 in accordance with certain implementations of the invention. The View-Type model 200 includes a ViewType class 210, a ViewList class 230, and a ViewElem class 250, along with the attributes and associations of the classes. An instance of the ViewType class 210 (also referred to as a "ViewType object") describes the main attributes of a ViewType and includes, for example, a viewName attribute for the name of the ViewType, a model attribute for the name of the base model on which the ViewType is based, a package name attribute, and an optional reference attribute for the name of the tool that owns (i.e., "created") the ViewType. The root ViewType instance has one association to a root ViewList instance. A package may be described in the UML/EMOF notation used for scoping data in an XML Metadata Interchange (XMI) file. A package may have associated attributes (e.g., definitions of special tags used in the XMI file, definitions of transformation rules, etc.).

A ViewList instance is also referred to as a "ViewList object." The root ViewList instance and all other instances of the ViewList class contain information about classes found in the base model. The ViewList class 230 includes an attribute called className that names the base model class that the ViewList represents. The ViewList class 230 also has a delete flag, which is used to indicate to a delete function whether or not base model objects should be deleted within the scope of the ViewType. A ViewList class 230 also may include a proxyViewName and proxyAttribs attributes. Presence of a value in the proxyViewName attribute indicates that the base model class represented by the ViewList class is a placeholder, and the details of the base model class are described by another ViewType class' ViewList class. The set of attribute names listed in the ViewList's proxyAttribs attribute specify which of the proxied class' attributes are to be processed with a ViewType instance. The proxyViewName attribute and the association to a ViewElem in a ViewList instance are mutually exclusive; if a ViewList instance does not refer to a proxy, the ViewList instance may alternatively have an association to a ViewElem. A ViewList instance may also have no association or proxy.

The ViewList instance has an association to a ViewElem instance for each attribute and association in the base model class that needs to be defined in this ViewType for the unit of work for which the ViewType will be used.

Each instance of the ViewElem class 250 has an attribute called attribName whose value matches the name of the attribute or association the ViewElem class represents in the base model class. A ViewElem instance of a ViewElem class 250 may have a value in its attribAltName attribute to specify an alternate name for the represented attribute. The attribAltName may be used to ensure uniqueness of the attribute name within the set of ViewElem instances for a ViewList instance. If a ViewElem instance represents an atomic type of attribute, such as an integer type or a string type, then the ViewElem instance will not have a nested ViewList instance or ViewName instance. If, on the other hand, a ViewElem instance represents an attribute that is a complex type represented by a base model class or represents a base model association, then the ViewElem instance will either be connected to a nested ViewList instance through a hasViewList association or have a value in its nestedViewName attribute. A hasViewList association connects the ViewElem instance to a ViewList instance for the base model's associated class and that ViewList instance defines the associated base model class' attributes, associations, etc. For the hasViewList relationship, the ViewList instance has a containing ViewElem instance. A value in the nestedViewName attribute names a ViewType instance whose root ViewList instance represents the base model's associated class, and the rest of that ViewType is used to define the associated base model class' structure.

When defining the ViewType, a recursive type of model is used that works its way down to the leaf-most nodes that should be traversed. At the point in the ViewType definition where the leaf-most nodes are described, there is a ViewElem. At the intermediate points in the ViewType definition where the tree continues to be defined, a ViewElem would be the source of a hasViewList relationship to another ViewList rooted on a ViewElem, and so this continues until the hasViewList relationship is not used (i.e., at the leaf-most node).

In certain implementations of the invention, a ViewElem instance representing an attribute or association may be used by one ViewList instance representing a class. To allow for reducing ViewType size, a ViewList instance may be nested by multiple ViewElem instances. Also a ViewType instance may be named as a nestedViewName by multiple ViewElem instances.

In order to define and process a subset of a base model required for a logical unit of work, implementations of the invention enable defining of ViewTypes 146. A ViewType 146 may be described as a user-defined scope or grouping of interrelated objects that can be used to access and manipulate instance data for a base model 142. A ViewType 146 references classes from the base model 142, starting from a root class, and identifies any attributes and/or associations to the base model classes'. The ViewType 146 branches out in a tree like structure, describing each of the associated classes needed by a logical unit of work. ViewTypes 146 are used to programmatically manipulate instances of the base model 142 at a less granular level than the class or object.

In certain implementations of the invention, a ViewType 146 is defined using an EMOF-based model (i.e., a type of base model 142). The ViewType 146 is described in an XMI format based on the ViewType Document Type Definition (DTD). A ViewType DTD may be described as a definition for a ViewType model, which contains the ViewType, ViewList, and ViewElem classes and associations.

Non-automated processes for creating ViewTypes 146 in the XMI format have proven to be very time consuming and error-prone. Implementations of the invention enable quickly and easily defining model-validated ViewTypes 146. For example, implementations of the invention allow the user to create and maintain valid ViewType XMI based on a user-specified EMOF-based model. The ViewType XMI describes a subset of base model classes, along with attributes and associations, as ViewType objects. ViewType objects are defined by the ViewType.

Figure 3:
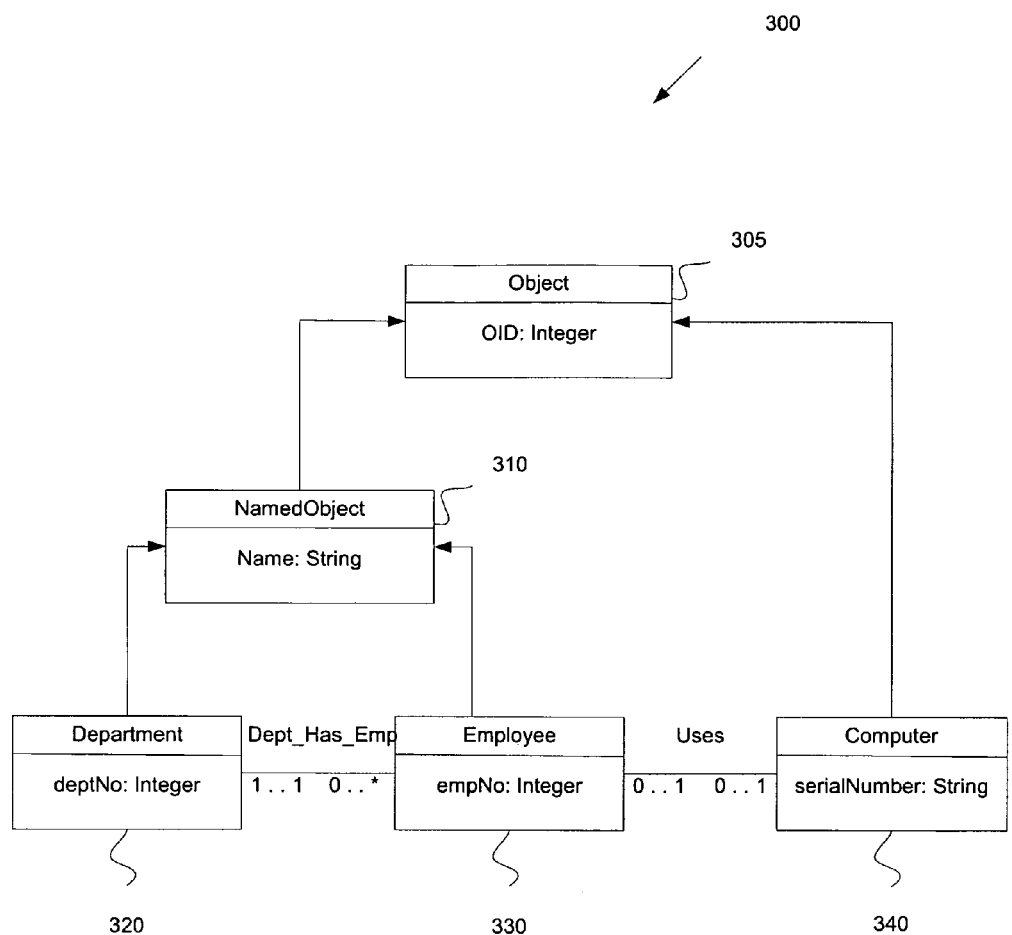
FIG. 3 illustrates an example of a Department-Employee base model that is an EMOF-based model in accordance with certain implementations of the invention.

The purpose of a base model 142 is to represent a set of objects and their relationships. For example, the base model 142 may be an EMOF-based model. FIG. 3 illustrates an example of a Department-Employee base model 300 that is an EMOF-based model in accordance with certain implementations of the invention. For example, the Department-Employee base model 300 describes a set of classes, attributes of the classes, and the associations from each class to other classes. In certain implementations of the invention, a graphical tool may be used to define the classes (e.g., Rational Rose Realtime available from International Business Machines, Corporation). Also, tools may be used to export the model as an XML Metadata Interchange (XMI) document describing the EMOF-based model. That is, certain tools (e.g., Rational Rose Realtime) output a model output file that can be transformed into XMI format, which is provided as input to certain implementations of the invention. The Department-Employee base model 300 includes a NamedObject class 310, which includes a "name" of string type. A Department class 320 includes a department number (labeled "deptNo") of integer type and inherits the characteristics of the NamedObject class 310. An Employee class 330 includes an employee number (labeled "empNo") of integer type and inherits the characteristics of the NamedObject class 310. A Computer class 340 includes a serial number (labeled "serialNumber") of string type. Also, all classes 310, 320, 330, 340 inherit the characteristics (i.e., the OID) of an object class 305 that is the top level class in a base model 142. In addition, an Employee is in one Department, a Department has 0-m (where m may be any integer value) Employees, and an Employee may have a Computer or may not have a Computer (i.e., a 0 . . . 1 relationship).

Both the Department class 320 and the Employee class 330 inherit from the NamedObject class 310. Because the Department class 320 inherits from the NamedObject class 310, the Department class 320 logically has two attributes: deptNo and name. Likewise, each instance of the Employee class may be thought to have two attributes: empNo and name. In addition, instances of the Department class 310 can be related to instances of the Employee class 330 via the Dept_Has_Emp association. Instances of the Employee class 330 may be related to instances of the Computer class 340 via the Uses association.

Implementations of the invention are capable of generating a relational schema 172 that represents a base model and of allowing instance data that conforms to that base model to be stored to and retrieved from a database defined by the relational schema 172. The base model describes a set of classes and attributes and their relationships to other classes. The relational schema 172 are tables that are created by DDL (e.g., DDL for Relational Schema A below).

For the Department-Employee model 300, the DDL generator 152 may generate DDL for a relational schema such as the following, in accordance with certain implementations of the invention:

---

Relational Schema A

```
CREATE TABLE NAMEDOBJECT(
    oid     INTEGER NOT NULL PRIMARY KEY,
    name    VARCHAR(254)
);
CREATE TABLE DEPARTMENT(
    oid     INTEGER NOT NULL PRIMARY KEY,
    deptNo  INTEGER
);
CREATE TABLE EMPLOYEE(
    oid     INTEGER NOT NULL PRIMARY KEY,
    empNo   INTEGER
);
CREATE TABLE DEPT_HAS_EMP(
    oid     INTEGER NOT NULL PRIMARY KEY,
    source  INTEGER NOT NULL REFERENCES
    DEPARTMENT(OID),
    target  INTEGER NOT NULL REFERENCES EMPLOYEE(OID),
    sequence INTEGER
);
CREATE TABLE COMPUTER(
    oid     INTEGER NOT NULL PRIMARY KEY,
    serialNumber VARCHAR(254)
    employee INTEGER
);
```

---

For example, the CREATE TABLE NAMEDOBJECT statement creates a table for instances of the NamedObject class 310. The CREATE TABLE DEPARTMENT statement creates a table for instances of the Department class 320. The CREATE TABLE EMPLOYEE statement creates a table for instances of the Employee class 330. The CREATE TABLE DEPT_HAS_EMP statement creates a table for the Dept_Has_Emp association between Department 320 and Employee 330 to store data about sources and targets in the association. The CREATE TABLE COMPUTER statement creates a table for instances of the Computer class 340.

In addition to the generated relational schema, a ViewType is built that is used to store and retrieve instances of the base model, whose data is stored in a database. The ViewType identifies a root class, and from that root class, associations are followed to related classes. At any point in the path, attributes from a class may be included in the ViewType.

For example, the following EmpDept ViewType rooted on Employee may be built in accordance with certain implementations of the invention:

---

```
EmpDept Viewtype
    Employee: name (attribAltName: empName)
        Dept_Has_Emp->
            Department: deptNo, name (attribAltName: deptName)
        Uses->
            Computer: serialNumber (attribAltName: computerSerial)
```

---

The EmpDept ViewType is rooted on Employee and includes a reference to the name of the Employee. The EmpDept ViewType also includes the Dept_Has_Emp relationship and the Uses relationship. The Dept_Has_Emp relationship indicates that the Employee has a relationship to a Department, and the EmpDept ViewType includes references to the department number ("deptNo") and name. The Uses relationship indicates that the Employee has a relationship to a Computer, and the EmpDept ViewType includes a reference to a serial number ("serialNumber") of the computer. Also, since the Dept_Has_Emp association is bidirectional, the Dept_Has_Emp association may be used to navigate either from Department to Employee or from Employee to Department. Note that the EmpDept ViewType that is based on the Department-Employee base model 300 does not include an employee number ("empNo" in FIG. 3).

When the EmpDept ViewType is used to retrieve data from a database, the EmpDept ViewType is interpreted to mean: for each employee of interest, create a result (e.g., an XML result) containing the name of the employee, the associated department number and department name, and the computer serial number for the computer used by the employee. The employees of interest are identified by supplying a select statement (e.g., a SQL SELECT statement) that returns Employee object identifiers (i.e., "oids").

Since the instance data for base models resides in a relational database, the instance data may be queried via select statements (e.g., SQL SELECT statements). However, with complex base models, it can be very difficult to compose a query that navigates from one type of object to another. For example, EMOF-based models may define classes with four or more levels of inheritance and relate the classes to any number of other classes. In conventional systems, writing queries that include a subset of an EMOF-based model may be both error-prone and time-consuming.

To resolve the problem of writing queries that navigate from one type of object to another, implementations of the invention provide a new ViewType_to_View command that generates a relational view from a ViewType. In certain implementations of the invention, the ViewType_to_View command specifies a relational schema, a base model, a ViewType, an output file, and, optionally, a WHERE clause to exclude some instance data. Execution of the ViewType_to_View command by the relational view generator 154 results in a CREATE VIEW statement that is stored in the output file. In particular, the ViewType indicates all the paths that should be navigated between objects and specifies the attributes of interest for each class. The relational view generator 154 generates the relational view from the ViewType by combining the ViewType with information from the corresponding base model and relational schema. That is, the relational view generator 154 walks down the ViewType, selecting attributes of the current class in the ViewType, and recursively following associations from that class to related classes. At that related class, the attributes of that related class are again selected and processed. This continues until the entire ViewType has been walked.

Figure 4:
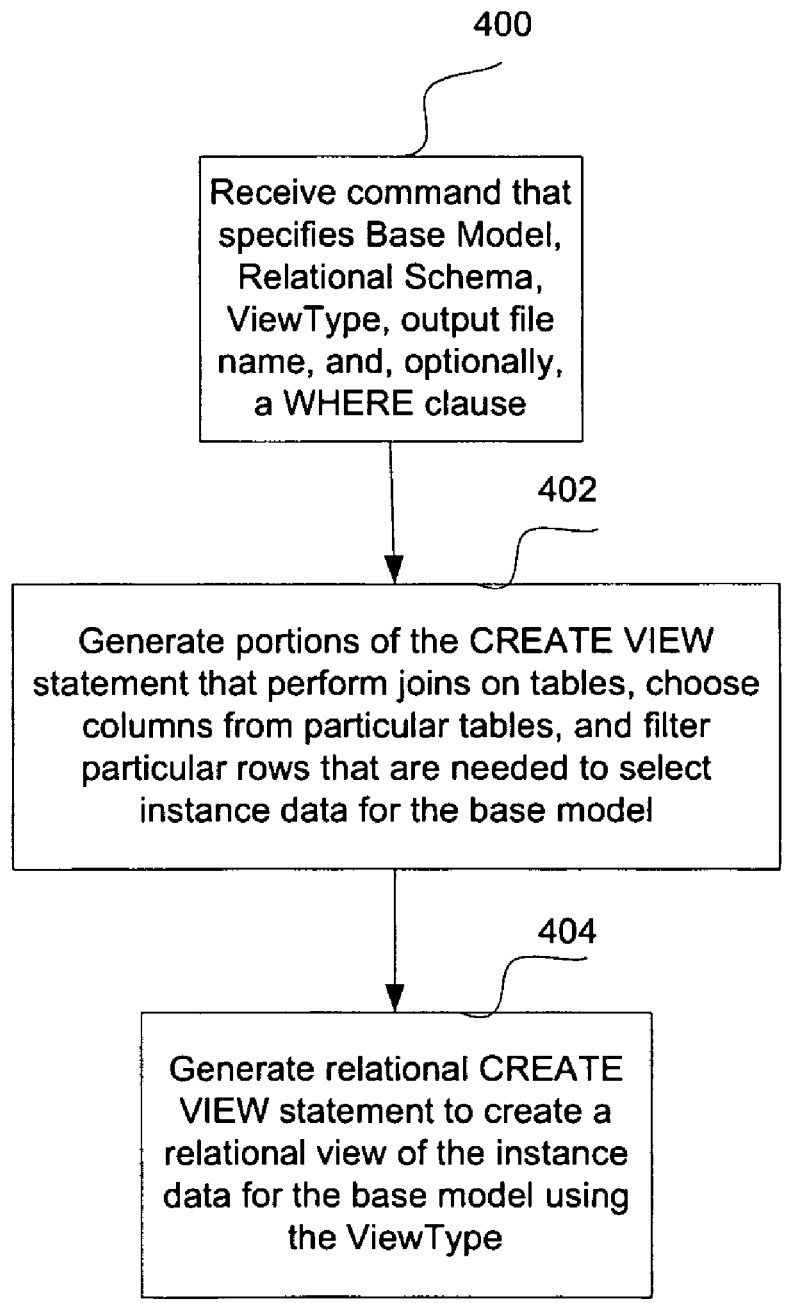
FIG. 4 illustrates logic implemented in a relational view generator to generate a relational CREATE VIEW statement in accordance with certain implementations of the invention.

FIG. 4 illustrates logic implemented in a relational view generator 154 to generate a relational CREATE VIEW statement in accordance with certain implementations of the invention. Control begins at block 400 with the relational view generator 154 receiving a ViewType_to_View command that specifies a base model 42, a relational schema, a ViewType 46, an output file name, and, optionally, a WHERE clause. In block 402, the relational view generator 154 generates portions of the CREATE VIEW statement that perform joins on tables, choose columns from particular tables, and filter the particular rows that are needed to select instance data for the base model 42. The instance data is selected from a database defined by the relational schema using the relational view that is created by the relational CREATE VIEW statement. In block 404, the relational view generator 154 generates a relational CREATE VIEW statement to create a relational view of the instance data using the ViewType 46.

Figure 5:
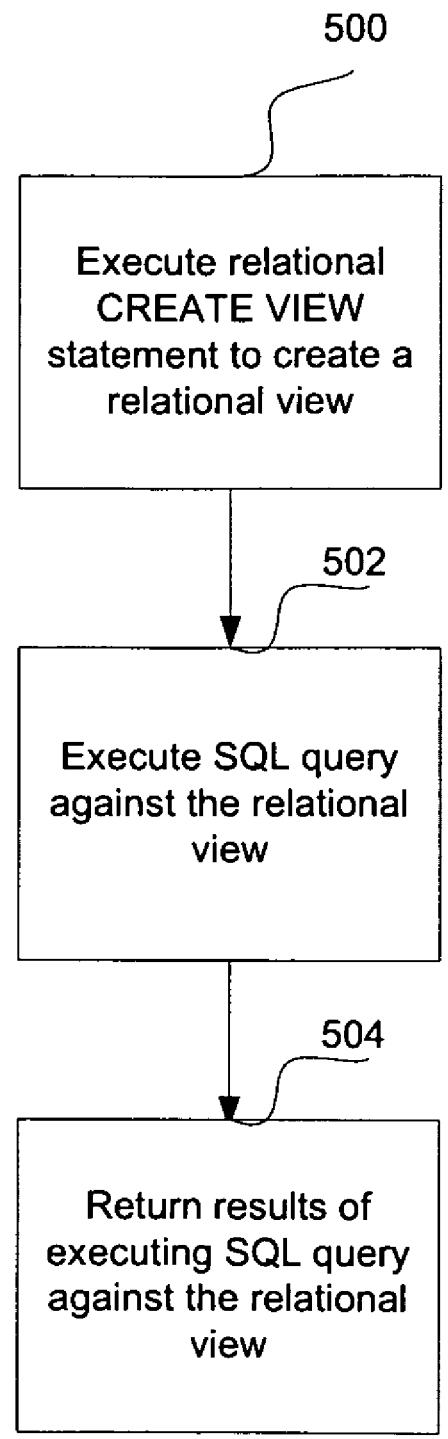
FIG. 5 illustrates logic for using a relational view in accordance with certain implementations of the invention.

Once the relational CREATE VIEW statement is created, the relational CREATE VIEW statement may be executed to create a relational view in the database schema. Then, queries (e.g., SQL queries) may be submitted against the relational view. FIG. 5 illustrates logic for using a relational view in accordance with certain implementations of the invention. Control begins at block 500 with the relational CREATE VIEW statement being executed to create a relational view. In block 502, a SQL query is executed against the relational view. In block 504, the results of executing the SQL query against the relational view are returned. The processing of block 502 may be invoked multiple times without recreating the relational view.

The following Pseudocode A lists pseudocode for processing performed by the relational view generator system 154 in accordance with certain implementations of the invention, and slashes (//) precede comments:

Pseudocode A

```
Main:
   fromClause = ' '
   selectClause = ' '
   Get ViewType root
   addAttributes(root)
   For each class related to the root of the ViewType
      do
         addRelTable(root, relatedClass)
         addAttributes(relatedClass)
      end
   Write relational view definition to a file
end Main
addRelTable(currentClass, nextClass):
   if (relationship from currentClass to nextClass is 1–1 or 0–1)
      do
         // there is no relationship table, so the target table can be
         // joined with the table for currentClass directly
      end
   else
      do
         SET fromClause = fromClause + join in the relationship table
      end
end addRelTable
addAttributes(currentClass):
   if (currentClass is the root)
      do
         SET fromClause = table representing the root
         SET selectList = selected attributes from the root table
      end
   else
      do
         SET fromClause = fromClause + join in the currentClass table
         SET selectList = selectList + selected attributes from the
         currentClass table
      end
   For each parent class of currentClass with attributes to be included
      SET fromClause = fromClause + join in the table for this parent class
      SET selectList = selectList + add all selected attributes from this
      parent class
   end
   For each class related to currentClass at this point in the ViewType
      do
         addRelTable(currentClass, relatedClass)
         addAttributes(currentClass)
      end
end addAttributes
```

To further clarify the Pseudocode A, an example using the Department-Employee base model 300, the EmpDept ViewType (described above), and Relational Schema A (described above) will be described. The EmpDept ViewType is rooted on Employee and includes a reference to the name of the Employee. The EmpDept ViewType also includes the Dept_Has_Emp relationship and the Uses relationship. The Dept_Has_Emp relationship indicates that the Employee has a relationship to a Department, and the EmpDept ViewType includes references to the department number ("deptNo") and name. The Uses relationship indicates that the Employee has a relationship to a Computer, and the EmpDept ViewType includes a reference to a serial number ("serialNumber") of the computer. Note that the EmpDept ViewType that is based on the Department-Employee base model 300 does not include an employee number ("empNo" in FIG. 3), and so employee number will not be included in the relational view generated using the EmpDept ViewType.

The EmpDept ViewType root, Employee, is used as the starting point of the relational view generation. The EmpDept ViewType specifies that the Employee's name attribute is to appear in the relational CREATE VIEW statement. Since employee's name attribute is inherited from the NamedObject class 310, a join is performed on the object identifier (i.e., "oid") to locate the name data in the parent table (i.e., the NAMEDOBJECT table). At this point, the relational view generator 154 generates the following SELECT 1 statement:

```
SELECT n.name FROM EMPLOYEE e                    (SELECT 1)
    JOIN NAMEDOBJECT n ON n.oid=e.oid
```

Next, the Dept_Has_Emp association of the EmpDept ViewType is followed to find the associated Department objects so that the department number (i.e., "deptNo") attribute may be included in the relational view. For the Dept_Has_Emp association, a DEPT_HAS_EMP table holds information about the association, which potentially has "many" objects at one end (i.e., a Department may have many Employees). Because the Dept_Has_Emp association is bidirectional, and the DEPT_HAS_EMP table was created to describe the association in the direction leading from Department to Employee, a join is performed with the DEPT_HAS_EMP table in the "inverse" direction. At this point, the relational view generator 154 revises the SELECT 1 statement, and the result is the SELECT 2 statement.

```
SELECT n.name, d.deptNo FROM EMPLOYEE e         (SELECT 2)
    JOIN NAMEDOBJECT n ON n.oid=e.oid
    LEFT OUTER JOIN DEPT_HAS_EMP de ON de.target=e.oid
    LEFT OUTER JOIN DEPARTMENT d ON d.oid=de.source
```

Then, a join is performed that provides the name attribute for a given Department. That name attribute for the Department is inherited from the NamedObject class 310, so a join is performed with the NAMEDOBJECT table. At this point, the relational view generator 154 revises the SELECT 2 statement, and the result is the SELECT 3 statement.

```
SELECT n.name, d.deptNo, n1.name FROM
    EMPLOYEE e                (SELECT 3)
        JOIN NAMEDOBJECT n ON n.oid=e.oid
        LEFT OUTER JOIN DEPT_HAS_EMP de ON de.target=e.oid
        LEFT OUTER JOIN DEPARTMENT d ON d.oid=de.source
        LEFT OUTER JOIN NAMEDOBJECT n1 ON n1.oid=d.oid
```

The last column to be added to the query is for the Computer's serialNumber attribute. Since the Uses relationship between Employee and Computer allows for one association between any Employee and Computer in this example, there is no intermediate table for the Uses relationship in Relational Schema A. Instead, the generated COMPUTER table has an additional employee column containing the object identifier ("oid") of any associated Employee. Thus, the relational view generator 154 revises the SELECT 3 statement, and the result is the SELECT 4 statement, which is the final SELECT statement for this example.

```
SELECT n.name, n1.name, d.deptNo,
    c.serialNumber               (SELECT 4)
    FROM EMPLOYEE e
        JOIN NAMEDOBJECT n ON n.oid=e.oid
        LEFT OUTER JOIN DEPT_HAS_EMP de ON de.target=e.oid
        LEFT OUTER JOIN DEPARTMENT d ON d.oid=de.source
        LEFT OUTER JOIN NAMEDOBJECT n1 ON n1.oid=d.oid
        LEFT OUTER JOIN COMPUTER c ON c.employee=e.oid
```

If an optional WHERE clause had been specified when the ViewType_to_View command was executed, it would have been added to the SELECT 4 statement. With the resulting query, the relational view generator 154 creates the following CREATE VIEW statement.

```
CREATE VIEW EmpDept(empName, deptNo, deptName,
computerSerial) AS
    SELECT n.name, d.deptNo, n1.name, c.serialNumber FROM
    EMPLOYEE e
        JOIN NAMEDOBJECT n ON n.oid=e.oid
        LEFT OUTER JOIN DEPT_HAS_EMP de ON de.target=e.oid
        LEFT OUTER JOIN DEPARTMENT d ON d.oid=de.source
        LEFT OUTER JOIN NAMEDOBJECT n1 ON n1.oid=d.oid
        LEFT OUTER JOIN COMPUTER c ON c.employee=e.oid
```

The CREATE VIEW statement identifies columns corresponding to attributes defined in the ViewType. The attribute alternate names from the EmpDept ViewType are used to make the column names of the generated view unique. For example, the Employee name is known as empName in the resulting relational view. Execution of the CREATE VIEW statement results in a relational view that filters instance data of a base model. The relational view can then be queried. The CREATE VIEW statement may be submitted for execution by a user at the client computer 100 or by an operator at the operator console 180.

Thus, implementations of the invention describe a technique for combining information from a base model, a relational schema, and a ViewType definition to automatically generate a relational view for accessing the instance data of the base model. Since the process is automated, the resulting relational view is known to be correct (e.g., without human error).

Additional Implementation Details

The described implementations may be implemented as a method, apparatus or article of manufacture using programming and/or engineering techniques to produce software, firmware, hardware, or any combination thereof. The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adapters, etc., may be implemented in one or more integrated circuits on the adapter or on the motherboard.

The logic of FIGS. 4 and 5 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 4 and 5 may be implemented in software, hardware, programmable and non-programmable gate array logic or in some combination of hardware, software, or gate array logic.

Figure 6:
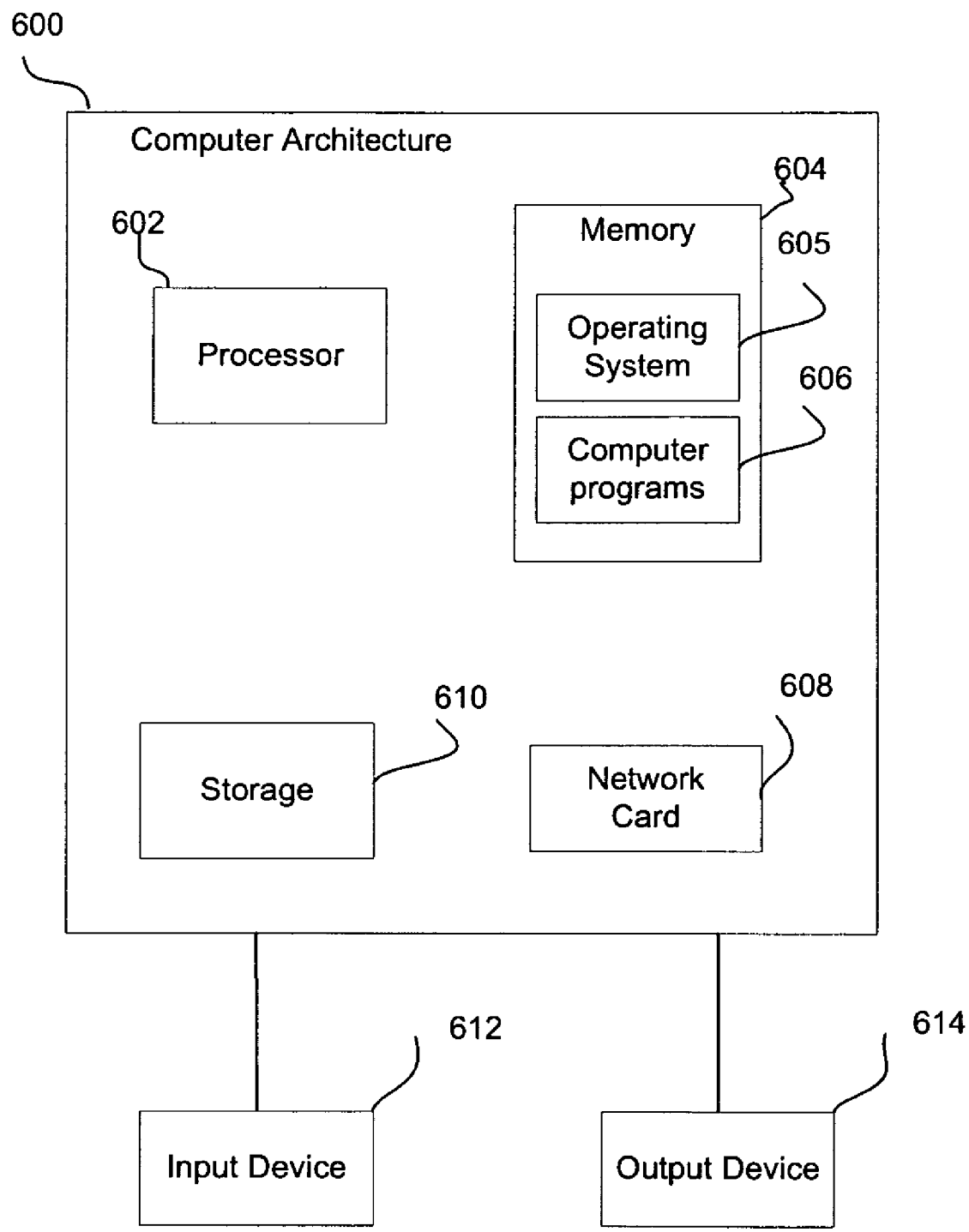
FIG. 6 illustrates an architecture of a computer system that may be used in accordance with certain implementations of the invention.

FIG. 6 illustrates an architecture of a computer system that may be used in accordance with certain implementations of the invention. Client computer 60, server computer 60, and/or operation console 180 may implement computer architecture 600. The computer architecture 600 may implement a processor 602 (e.g., a microprocessor), a memory 604 (e.g., a volatile memory device), and storage 610 (e.g., a non-volatile storage area, such as magnetic disk drives, optical disk drives, a tape drive, etc.). An operating system 605 may execute in memory 604. The storage 610 may comprise an internal storage device or an attached or network accessible storage. Computer programs 606 in storage 610 may be loaded into the memory 604 and executed by the processor 602 in a manner known in the art. The architecture further includes a network card 608 to enable communication with a network. An input device 612 is used to provide user input to the processor 602, and may include a keyboard, mouse, pen-stylus, microphone, touch sensitive display screen, or any other activation or input mechanism known in the art. An output device 614 is capable of rendering information transmitted from the processor 602, or other component, such as a display monitor, printer, storage, etc. The computer architecture 600 of the computer systems may include fewer components than illustrated, additional components not illustrated herein, or some combination of the components illustrated and additional components.

The computer architecture 600 may comprise any computing device known in the art, such as a mainframe, server, personal computer, workstation, laptop, handheld computer, telephony device, network appliance, virtualization device, storage controller, etc. Any processor 602 and operating system 605 known in the art may be used.

The foregoing description of implementations of the invention has been presented for the purposes of illustration and description. It is not intended to be exhaustive or to limit the implementations of the invention to the precise form disclosed. Many modifications and variations are possible in light of the above teaching. It is intended that the scope of the implementations of the invention be limited not by this detailed description, but rather by the claims appended hereto. The above specification, examples and data provide a complete description of the manufacture and use of the composition of the implementations of the invention. Since many implementations of the invention can be made without departing from the spirit and scope of the implementations of the invention, the implementations of the invention reside in the claims hereinafter appended or any subsequently-filed claims, and their equivalents.

What is claimed is:

1. A method for generating a relational view, comprising:
  receiving a command identifying a base model, a relational schema, and a ViewType, wherein the base model represents a set of classes, attributes of the classes, and associations between classes, and wherein the ViewType references the set of classes, the attributes of the classes, and the associations between the classes of the base model as ViewType objects;
  executing the command to automatically generate a statement to create a relational view of instance data for the base model using the ViewType by walking down the ViewType, wherein for each class, the attributes of the class are selected and the associations are recursively followed from the class to related classes where attributes are selected, and wherein the statement to create the relational view identifies columns corresponding to attributes defined in the ViewType; and
  executing the statement to create the relational view.

2. The method of claim 1, further comprising:
  executing a query against the relational view; and
  returning results of executing the query, wherein the relational view is capable of being queried multiple times without recreating the relational view.

3. The method of claim 1, wherein the statement to create the relational view comprises a CREATE VIEW statement that includes a SELECT statement with joins.

4. The method of claim 1, wherein generating the statement to create the relational view further comprises:
  generating a statement to select the instance data for the base model from a database defined by the relational schema.

5. The method of claim 1, wherein the command identifies an output file name, and wherein the statement is stored in an output file with the output file name.

6. The method of claim 1, wherein the command identifies a WHERE clause, and the generated statement includes the WHERE clause.

7. An article of manufacture comprising a computer-readable storage medium including a program for generating a relational view, wherein the program is capable of causing operations to be performed, the operations comprising:
  receiving a command identifying a base model, a relational schema, and a ViewType, wherein the base model represents a set of classes, attributes of the classes, and associations between classes, and wherein the ViewType references the set of classes, the attributes of the classes, and the associations between the classes of the base model as ViewType objects;

executing the command to automatically generate a statement to create a relational view of instance data for the base model using the ViewType by walking down the ViewType, wherein for each class, the attributes of the class are selected and the associations are recursively followed from the class to related classes where attributes are selected, and wherein the statement to create the relational view identifies columns corresponding to attributes defined in the ViewType; and executing the statement to create the relational view.

8. The article of manufacture of claim 7, wherein the operations further comprise:

executing a query against the relational view; and returning results of executing the query, wherein the relational view is capable of being queried multiple times without recreating the relational view.

9. The article of manufacture of claim 8, wherein the statement to create the relational view comprises a CREATE VIEW statement that includes a SELECT statement with joins.

10. The article of manufacture of claim 7, wherein operations for generating the statement to create the relational view further comprise:

generating a statement to select the instance data for the base model from a database defined by the relational schema.

11. The article of manufacture of claim 7, wherein the command identifies an output file name, and wherein the statement is stored in an output file with the output file name.

12. The article of manufacture of claim 7, wherein the command identifies a WHERE clause, and the generated statement includes the WHERE clause.

13. A system for generating a relational view, comprising:

circuitry comprising hardware logic capable of performing operations, the operations comprising:

receiving a command identifying in a base model, a relational schema, and a ViewType, wherein the base model represents a set of classes, attributes of the classes, and associations between classes, and wherein the ViewType references the set of classes, the attributes of the classes, and the associations between the classes of the base model as ViewType objects;

executing the command to automatically generate a statement to create a relational view of instance data for the base model using the ViewType by walking down the ViewType, wherein for each class, the attributes of the class are selected and the associations are recursively followed from the class to related classes where attributes are selected, and wherein the statement to create the relational view identifies columns corresponding to attributes defined in the ViewType; and executing the statement to create the relational view.

14. The system of claim 13, wherein the operations further comprise:

executing a query against the relational view; and returning results of executing the query, wherein the relational view is capable of being queried multiple times without recreating the relational view.

15. The system of claim 13, wherein the statement to create the relational view comprises a CREATE VIEW statement that includes a SELECT statement with joins.

16. The system of claim 13, wherein operations for generating the statement to create the relational view further comprise:

generating a statement to select the instance data for the base model from a database defined by the relational schema.

17. The system of claim 13, wherein the command identifies an output file name, and wherein the statement is stored in an output file with the output file name.

18. The system of claim 13, wherein the command identifies a WHERE clause, and the generated statement includes the WHERE clause.

* * * * *